March 25, 1969
H. J. FREEDMAN
3,434,898
METHODS AND DEVICES FOR HANDLING AND APPLYING
OF THIN FILM MATERIALS
Filed Oct. 22, 1965
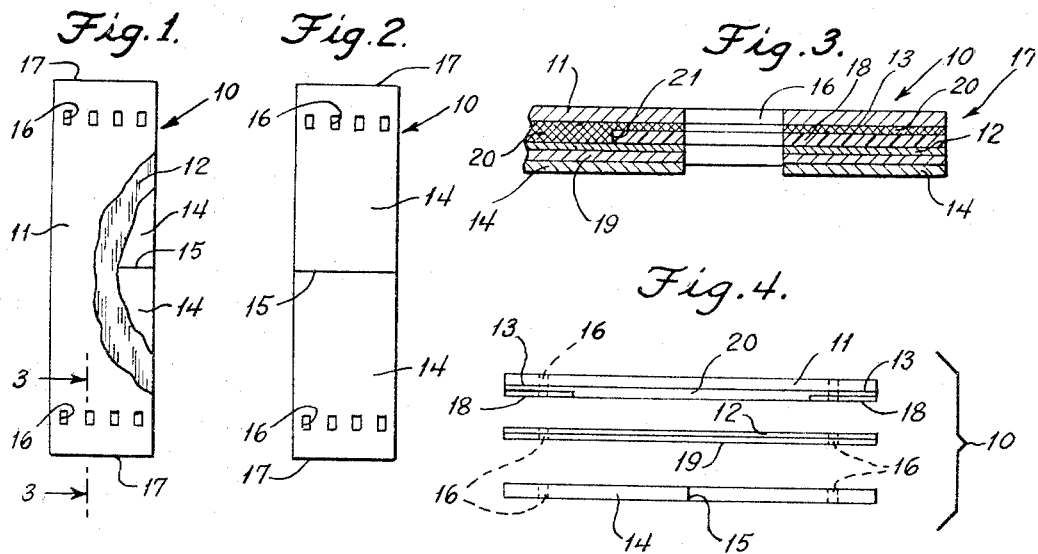
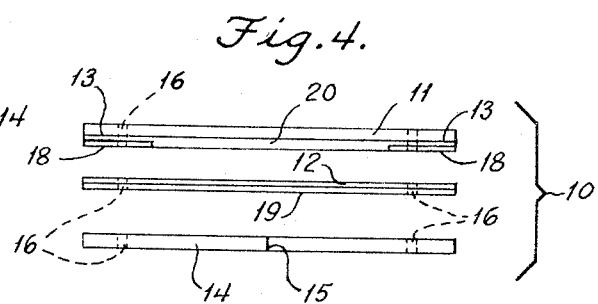
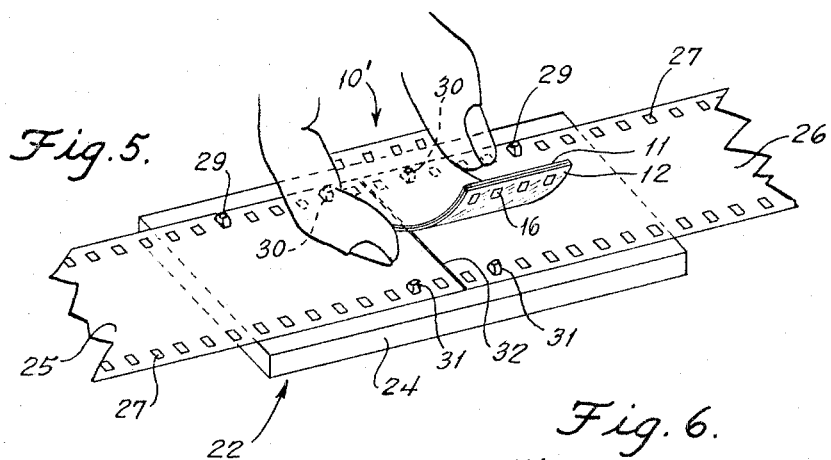
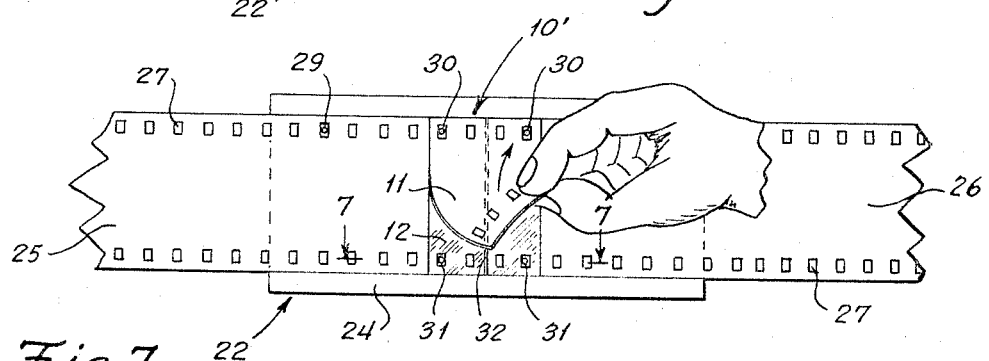
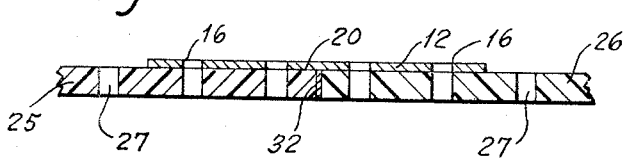
INVENTOR.
HAROLD J. FREEDMAN
BY Albert M. Parker
ATTORNEY.

United States Patent Office 3,434,898
Patented Mar. 25, 1969

3,434,898
METHODS AND DEVICES FOR HANDLING AND APPLYING OF THIN FILM MATERIALS
Harold J. Freedman, Great Neck, N.Y., assignor to De Luxe Laboratories, Inc., New York, N.Y., a corporation of New York
Filed Oct. 22, 1965, Ser. No. 502,239
Int. Cl. B32b 3/02, 3/10
U.S. Cl. 156—157          8 Claims

ABSTRACT OF THE DISCLOSURE

The device is a narrow strip of thin transparent material carrying pressure sensitive adhesive on its under surface to which surface is applied a covering strip. The pressure sensitive adhesive is less adherent to the covering strip than to the transparent strip. Provision for removing this covering strip is included. To the other side of the transparent strip there is applied a support strip carrying a pressure sensitive adhesive more adherent to it than to the transparent strip. Provision for starting the removal of this outer support strip is also included. The method is concerned among other things with the removal of the covering strip on the under surface of the transparent strip, the application of the transparent strip to elements to be joined and the eventual removal of the outer support strip.

---

The method of the invention of handling thin materials, and the novel device of the invention, are capable of use to advantage in a large number of applications wherein a thin sheet of material is to be applied to a surface and retained thereon by a thin layer of adhesive. The invention is described below in connection with its use in an illustrative, non-limiting application, the splicing of motion picture film.

There is a need for the secure splicing of strips of flexible transparent material, such as sections of strip film. With film, particularly motion picture film, it is necessary that the splice be not appreciably thicker than the film itself. Consequently it has been attempted to splice motion picture film by cutting the ends of the film sections transversely to the length of the sections, and securing the butted or overlapped ends of the film sections together by an adhesive or by welding, that is, partial melting and compaction of the overlapped ends of the film sections.

Such joints, however, sometimes lack the requisite strength and flexibility for the repeated running of the spliced film strip through and rewinding it from a projector. In accordance with the present invention the joint whether butted or overlapped between film sections is formed or reinforced by means of thin transparent plastic tape which is applied in a novel manner to the film sections being spliced.

It is, accordingly, one of the objects of the present invention to provide a novel laminated material.

Another object of the invention is to provide a novel method for applying and securing thin material to other surfaces.

Still another object of the invention is the provision of such novel method applied to strip material such as film provided with spaced sprocket holes along at least one of the side edges of the strip material.

Yet, another object of the invention lies in the provision of a novel device for splicing strip material such as strips of motion picture film, and the like.

The above and further objects and novel features of the invention will more fully appear from the following description when the same is read in connection with the accompanying drawings. It is to be expressly understood, however, that the drawings are for the purpose of illustration only, and are not intended as a definition of the limits of the invention.

In the drawings, wherein like reference characters refer to like parts throughout the several views, FIG. 1 is a view in top plan of a preferred embodiment of film splicing device in accordance with the invention, the upper two layers of the device being progressively broken away in a central portion of the device;

FIG. 2 is a view in bottom plan of the device of FIG. 1;

FIG. 3 is an enlarged fragmentary view in section through the device of FIGS. 1 and 2, the section being taken along the line 3—3 of FIG. 1;

FIG. 4 is an exploded view in side elevation of the device of FIGS. 1 and 2;

FIG. 5 is an enlarged fragmentary view in perspective showing an intermediate step in the splicing of two film strip sections;

FIG. 6 is an enlarged fragmentary view in plan showing the final step in the splicing of the two film strip sections shown in FIG. 5; and FIG. 7 is an enlarged fragmentary view in section through a joint between film sections made in accordance with the invention, the section being taken along the line 7—7 of FIG. 6.

The preferred embodiment of film splicing device shown herein is generally designated by the reference character 10. Such device is in the form of a three-layered strip having an upper support layer 11 made of relatively stiff paper or plastic sheet material, an intermediate thin flexible transparent layer or film 12, and a protective lower or bottom layer 14, made out of calendered paper or comparable sheet material. The lower layer 14 is preferably made easily removable from the other layers of device 10, for the reasons to be described, by slitting it across along a generally central line 15 so that the ends of the layer 14 at the slit may be readily projected upwardly so they may be grasped for removal. The device 10 is made to have a length no greater than and preferably slightly less than the width of the film strips to be joined. Also the member 10 has a number (four shown) of sprocket holes 16 therethrough along each edge corresponding to those in the film strips.

The intermediate layer 12 may be, for example, a polyester film such as that made by E. I. du Pont de Nemours and Co. and sold under the trademark "Mylar." In the device 10 the lower surface of the intermediate layer 12 has the protective layer 14 temporarily bonded thereto by a coating 19 of pressure sensitive adhesive. The lower surface of the upper support layer 11 is temporarily bonded to the intermediate layer 12 by a second pressure sensitive adhesive coating 20. However the undersurface of the coating 20 is covered for the full width and for a short distance inwardly from the end edges 17 of the splicing device 10 by a layer 18 of thin film-like material which may be the same as the material of layer 12. The presence of this layer 18 prevents adhesion of the support layer 11 to the intermediate layer 12 adjacent the ends of the device so enables the operator to readily separate the layers 11 and 12 and to secure a firm grip on the end of the layer 11 to remove it.

As shown the protective layer 18 extends in to the position 21 (FIGS. 3 and 4). Where it is applied it displaces part of the thickness of the adhesive layer 20.

The pressure sensitive adhesive coatings 19 and 20, which may be made of conventional material, are applied in conventional manner to the lower surface of layer 12 and to the lower surface of layer 11, respectively. The coating on support layer 11 is lightly adherent to the upper surface of layer 12 and hence layer 11 may be easily stripped from layer 12 without leaving residual adhesive on the top surface of layer 12. Protective layer 14 is lightly adhered to the adhesive coating on the lower surface of layer 12 and hence can be easily stripped clean of this adhesive coating. When the bottom protective layer 14 and the top support layer 11 with its adhesive 20 is removed what remains is layer 12 with its adhesive 19 to firmly secure the layer 12 to the film ends to be joined or other material to be joined or covered. The presence of cover strips 18 readily permits either end of the support layer 11 to be separated from the intermediate layer 12, so that such separated end of strip 11 may be grasped and the strip 11 thus stripped completely off layer 12.

In butt splicing two sections of motion picture film 25 and 26 (FIGS. 5, 6 and 7), the confronting ends of the film sections are cut straight across at a predetermined distance from the last pair of sprocket holes in the sections. The film sections 25 and 26 are then laid, similar sides up, upon the platen or base plate 24 of a splicing jig 22 having upstanding spacing and holding pins 29, 30 along one edge and 31 along the other. Such pins protrude through sprocket holes in the respective edges of the film sections and hold the sections in alignment. If desired a slight space may be left between the confronting ends of the film sections and a liquid or semi-liquid adhesive may be deposited between such ends to form an adhesive line 32, though an effective butt joint can be readily made employing the splicing device 10 with the film ends abutted and without any adhesive between them. Alternately, surface portions adjacent the ends of one or both film sections may be overlapped and coated with adhesive before the film sections are mounted on the splicing jig 22.

Following this, a splicing device 10 is employed to form or strength the joint between the film sections. To do this, the device 10 is flexed to render the bottom layer 14 convex, thereby to break such layer by opening up the slit 15. The ends of the resulting two halves of layer 14 are then stripped from the intermediate layer, starting from central edges of the resulting halves of the layer.

The splicing device, now reduced in its intermediate portion to layers 11 and 12 adhesively secured together by layer 20 and now designated 10', and with the pressure sensitive adhesive coating 19 exposed on the bottom of layer 12, is now applied to the joint in the manner shown in FIG. 5. Device 10' is grasped by its side edges between the operator's thumb and forefinger, one end of the device is mounted over pin 30 or 31 of the splicing jig, and the device 10' is now lowered in extended condition upon the ends of the film sections so that the pins on the other side of the jig protrude through the respective sprocket holes on the other end of device 20. The device 10' may now be firmly pressed down upon the ends of the film sections 25 and 26, as by one's hand.

Finally, as shown in FIG. 6, the upper support layer 11 of device 10' is stripped from the spliced joint. Either of the unadhered edges of the layer 11 at the location of the respective edge strip 18 may be readily lifted by running a finger or thumb upwardly past such edge. The lifted edge of layer 11 is then grasped, as shown, and the support layer 11 with the edge strips 18 adhered thereto is stripped off the layer 12. Without the support of layer 11 until the splicing strip or layer 12 of thin sheet material is secured in place at the splice, it would be extremely difficult, if not quite out of the question, to handle the layer 12. Certainly the handling of it, particularly with an adhesive coating on its lower face, would, in the absence of the support layer 11, be so difficult that splicing by this system would hardly be a commercial practice. The addition of the layer 11, however, providing support for the layer 12 until the latter is secured in splicing position changes all this and enables the splicing strips of the invention to be handled and applied effectively and instantaneously.

The resulting splice, shown in FIG. 7, is but little thicker than the film itself, has good tensile strength, and withstands repeated flexing. The splicing method of the invention is simply and economically carried out. The splicing device 10 is readily stored because of its support layer 11 and its protective layer 14 and is easy to handle because of the relatively heavy support layer 11 and its layer 14 with which it is initially provided. Correct alignment of the device 10 is assured by use of the splicing jig; the pressure sensitive adhesive layer 19 on the plastic splicing layer 12 need not be touched by the hand or anything else which would impair its adhesive properties before it is applied to the film sections being spliced.

Although only one embodiment of the invention has been illustrated in the accompanying drawings and described in the foregoing specification, it is to be especially understood that various changes, such as in the relative dimensions of the parts, materials used, and the like, as well as the suggested manner of use of the apparatus of the invention, may be made therein without departing from the spirit and scope of the invention, as will now be apparent to those skilled in the art. Thus the device and method of the invention may be employed to form or strengthen joints between sheets or strips, and may also be employed to deposit thin layers of sheet material upon various other surfaces in a facile readily controlled manner.

What is claimed is:

1. A laminated sheet material, comprising a composite strip including a removable bottom protective layer, an intermediate layer of thin flexible transparent web material, and an upper removable supporting layer, and first and second pressure sensitive coatings of adhesive material temporarily adhering the bottom layer to the intermediate layer, and the upper layer to the intermediate layer, respectively, said bottom layer being made of relatively flexible material and said bottom layer being slit transversely for breaking intermediate its length for ready stripping of the same from the intermediate layer and exposure of the adhesive thereon.

2. A device for splicing sections of film strip having sprocket holes along the edges thereof comprising a composite strip including a removable bottom masking layer, an intermediate layer of thin flexible transparent web material, and an upper removable supporting layer, and first and second pressure sensitive coatings of adhesive material temporarily adhering the bottom layer to the intermediate layer, and the upper layer to the intermediate layer, respectively, said upper and intermediate layers of the device having aligned sprocket holes spaced along the side edges of the device in the same manner as the sprocket holes in the film strips to be joined.

3. A device for splicing sections of film strip having sprocket holes along the side edges thereof, comprising a composite strip including a removable bottom protective layer, an intermediate layer of thin flexible transparent web material, and a relatively stiff upper removable support layer, and first and second pressure sensitive layers of adhesive material temporarily adhering the bottom layer to the intermediate layer, and the upper layer to the intermediate layer, respectively, the first layer of adhesive being strongly adhered to the intermediate layer and less strongly adhered to the bottom layer, whereby upon stripping the bottom layer from the intermediate layer of the device substantially all of the first adhesive layer remains affixed to the intermediate layer, the second layer of adhesive being strongly adhered to the upper layer and much less strongly to the intermediate layer, whereby upon stripping the upper layer from the intermediate layer of the device substantially all of the second adhesive layer remains affixed to the upper layer and is removed therewith, the layers of the device having aligned sprocket holes spaced along the end edges of the device similarly to the sprocket holes in the film strips to be joined.

4. A device as claimed in claim 3, comprising further narrow strips adhered to the second adhesive layer at the end edges thereof, said further strips confronting and being unbonded to the end edges of the intermediate layer, whereby the end edge portions of the upper layer may be readily grasped for removal of the upper layer from the intermediate layer.

5. A method of splicing two sections of film strip, which comprises, placing the film strip sections in alignment and locating the confronting edges thereof close to each other, and joining the sections of film strip by bonding to the film strip sections a thin flexible layer of transparent material transversely of the joint and overlapping the transverse edges of the film sections which includes, presenting the thin flexible layer of transparent material to the closely abutting film strips in the form of a composite strip having an upper layer of material adhered to said thin flexible layer except for various bonds along the remote ends thereof there being spacing layers along said bands preventing adherence between said thin flexible layer and said upper layer along said bands, and having said thin flexible layer of transparent material as the intermediate layer thereof, said intermediate layer having a lower layer of pressure sensitive adhesive on its lower, exposed surface which is applied to the film strips, and, after presentation of such composite strip of material to the film strips with the layer of pressure sensitive material applied to the film strips, lifting one of said band portions of said upper layer, gripping the same and removing said upper layer of material from the intermediate layer of material as thus applied to the joined film strips.

6. A laminated sheet element comprising a composite strip including a removable bottom protective layer, an intermediate layer of thin flexible transparent web material and an upper removable supporting layer, and first and second pressure sensitive coatings of adhesive material temporarily adhering the bottom layer to the intermediate layer, and the upper layer to the intermediate layer, respectively, said second coating of adhesive being strongly adhered to said upper layer and much less strongly adhered to said intermediate layer, and said upper layer being free from adhesion to said intermediate layer along bands extending inwardly from the remote ends of said composite strip whereby said bands of said upper layer may be readily lifted up and grasped for removal of said upper support layer.

7. A laminated sheet element as in claim 6, said second coating of adhesive extending to the remote ends of said composite strip and a strip element extending between said adhesive coating and said intermediate layer throughout said bands.

8. A laminated sheet element as in claim 7, said strip element being secured to said adhesive coating.

References Cited

UNITED STATES PATENTS 2,506,933   5/1950   Mercer _____ 287—63

FOREIGN PATENTS 626,435   8/1961   Canada.

EARL M. BERGERT, *Primary Examiner.*

M. L. KATZ, *Assistant Examiner.*

U.S. Cl. X.R.

156—249, 304; 161—113, 406